(12) United States Patent
Wang (10) Patent No.: US 7,527,293 B1
(45) Date of Patent: May 5, 2009

(54) LOCKABLE STEERING WHEEL QUICK-RELEASE UNIT

(76) Inventor: Calvin S. Wang, 768 S. Turnbull Canyon Rd., City of Industry, CA (US) 91745

( * ) Notice: Subject to any disclaimer, the term of this patent is extended or adjusted under 35 U.S.C. 154(b) by 14 days.

(21) Appl. No.: 11/398,865

(22) Filed: Apr. 7, 2006

(51) Int. Cl.
*B62D 1/00* (2006.01)
(52) U.S. Cl. .......................... 280/771; 70/207; 70/214; 74/548; 74/552; 200/61.54; 403/321
(58) Field of Classification Search ................ 280/775, 280/771; 70/207, 209, 214; 74/552, 548; 403/286, 321, 322; 200/61.54, 61.55
See application file for complete search history.

(56) References Cited

U.S. PATENT DOCUMENTS

| | | | |
|---|---|---|---|
| 4,184,692 A * | 1/1980 | Benson et al. ................ 279/75 |
| 4,645,372 A * | 2/1987 | Suzuki ........................ 403/325 |
| 4,881,389 A * | 11/1989 | Alfon et al. ................... 70/209 |
| 5,941,131 A | 8/1999 | Fohl | |
| 6,076,425 A * | 6/2000 | Worrell et al. ................ 74/552 |
| 6,257,088 B1 * | 7/2001 | Broughton .................. 74/552 |
| 6,314,833 B1 | 11/2001 | Pillsburg, IV | |
| 6,318,756 B1 * | 11/2001 | Papandreou ................ 280/775 |
| 6,802,193 B1 | 10/2004 | Long | |
| 6,971,675 B2 * | 12/2005 | Dahmer ...................... 280/775 |
| 7,104,156 B2 * | 9/2006 | Affleck et al. ................ 74/552 |
| 2002/0124681 A1 | 9/2002 | Hobaugh, II | |
| 2004/0100143 A1 * | 5/2004 | Dahmer ................ 301/111.04 |

\* cited by examiner

*Primary Examiner*—Eric Culbreth
(74) *Attorney, Agent, or Firm*—Albert O. Cota (57) ABSTRACT

A lockable steering wheel quick-release unit (10) for use in an automotive vehicle having a steering shaft and a steering wheel. The unit consists of a steering shaft hub (30) that attaches to an Original Equipment Manufacturer (OEM) vehicle steering shaft (28). An extending hub (42) attaches to the hub (30) with threaded fasteners (44), and an adapter (50), covered by a release sleeve (56), attaches the steering wheel to the unit (10) and interfaces directly with the extending hub (42). A plurality of balls (62) are locked between the extending hub (42) and the adapter (50), thereby maintaining a locked position until released by sliding the sleeve (56) into an unlocked ball position. An ejection compression spring (48) provides loading to assist in ejecting the adapter and attached steering wheel when released. A lock unit (24) is provided having a high-security push bolt lock (94) which is disposed upon the extending hub (42) for vehicle protection when the steering wheel with the adapter has been removed.

17 Claims, 5 Drawing Sheets

LOCKABLE STEERING WHEEL QUICK-RELEASE UNIT

TECHNICAL FIELD

The invention generally pertains to quick-release hubs and more specifically to a vehicle steering wheel quick-release unit having the capability of locking a steering wheel hub when a steering wheel has been removed.

BACKGROUND ART

Previously, many types of hubs for attaching automotive steering wheels have been used to provide an effective means for positive engagement, however few inventions have provided a quick-release system for attachment and release of a steering wheel.

The prior art listed below did not disclose patents that possess any of the novelty of the instant invention; however the following U.S. patents are considered somewhat related:

| U.S. Pat. No. | Inventor | Issue Date |
| --- | --- | --- |
| 5,941,131 | Fohl | Aug. 14, 1999 |
| 6,314,833 | Pillsbury, IV | Nov. 13, 2001 |
| 6,802,193 | Long | Oct. 12, 2004 |
| 6,971,673 | Dahmer | Dec. 6, 2005 |
| Patent Application Publication | | |
| 2002/0124681A1 | Hobaugh, II | Sep. 12, 2002 |

Fohl in U.S. Pat. No. 5,941,131 discloses a device for attaching of a steering wheel. The invention utilizes a connecting sleeve that is attached to a hub on the exterior surface of a set of splines located on the shaft, and the connecting sleeve has an axial slot attached by a screw.

U.S. Pat. No. 6,314,833 issued to Pillsbury IV discloses a means for attaching a steering wheel to a vehicle steering shaft utilizing splines that mate with a hub. Bolt engagements create a compressive reaction load between the hub and the shaft, thereby blocking axial movement therebetween.

Long in U.S. Pat. No. 6,802,193 discloses a removable steering wheel device to prevent theft. A boss engages the steering shaft with a bayonet connection assembly and a locking cap located in the bore of the boss. The locking cap prevents rotation of the boss relative to the upper end of the steering shaft, thereby fixing the cap within the bore.

Dahmer in U.S. Pat. No. 6,971,673 discloses a quick-release steering wheel system that utilizes a billet hub adapter with holes for attachment of an OEM steering wheel. A commonly available pin-less quick-release mechanism is attached to the hub adapter via counter-sunk holes. The adapter may also be used in the racing environment, and yet maintains a pleasing appearance for street vehicles.

Patent Application Publication 2002/0124681A1 issued to Hobaugh II teaches an apparatus for attaching a vehicle steering wheel to a steering shaft. The steering wheel has a hub with a tapered surface into which the steering shaft extends. A collet engages the tapered surface and a fastener connects the wheel to the shaft, thereby forcing the collet into the tapered surface of the hub.

DISCLOSURE OF THE INVENTION

Many racetracks and racing organizations require quick-release steering wheels for safety purposes and to allow to a driver access to the driver's compartment since many vehicle doors are permanently sealed and the windows are removed. Since many racing vehicles are modified and include expensive components and conversions, the value of the vehicle substantially increases, thereby making theft prevention extremely important. Therefore, the primary object of the invention is to safeguard a vehicle by not only removing the steering wheel and storing it in a safe place, but also to prevent thieves who could duplicate the quick-release unit by providing a lock unit that attaches directly to the remaining components of the vehicle steering unit.

An important object of the invention relates to safe-guarding street vehicles that have basically the same security problems as their racing counterpart without the limitations of door modification. In some cases involving exotic cars, where the use of a custom steering wheel is common, the vehicle cost may also be enormous. With this in mind, the invention becomes even more desirable, when a street machine is parked in public areas. When using the invention, the steering wheel is removed, the lock is placed on the steering shaft hub and is locked by rotating an outer cover, which is the top portion of the unit, then depressing the high-security lock which is simple and easily understood.

Another object of the invention is the aesthetic appearance of the quick-release unit and the accompanying lock which adds to the overall appearance of the vehicle since a custom steering wheel remains visible when the invention is used.

Still another object of the invention provides convenience for working on vehicle's dashboard and control console from the front seat since, when the steering wheel is removed, ample access is provided.

Yet another object of the invention is the strength of the lock unit as it has no obvious weaknesses since it is made of a solid block of aluminum, with the high-security lock imbedded in the body itself. If a perpetrator drills the top of the body there is no way to remove the ball that locks the device to the steering shaft hub. Even if the lock is breeched and removed, the lock bolt is spring-loaded to remain within the lock bolt hole. Further, as the components of the lock are aluminum drilling can create sufficient heat to bond the parts together in the critical areas, making it still more difficult to rotate the outer cover to release a steel ball that creates the locking feature.

A further object is that the invention permits use of a wide variety of custom steering wheels, since the only interface of the steering wheel to the adapter is a series of bolt holes for attachment with an ordinary fastener. Because there are a myriad of designs and configurations of custom wheels, a user has a broad choice that would be easily adapted to the invention.

A final object of the invention is the ease of use, as installation is simple and straightforward. When the steering wheel is to be removed, a spring-loaded slide release sleeve is retracted under spring pressure, and a release pin is simultaneously depressed, which is natural in its movements and rapid since there is no other release mechanism evolved.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figures 1, 2:
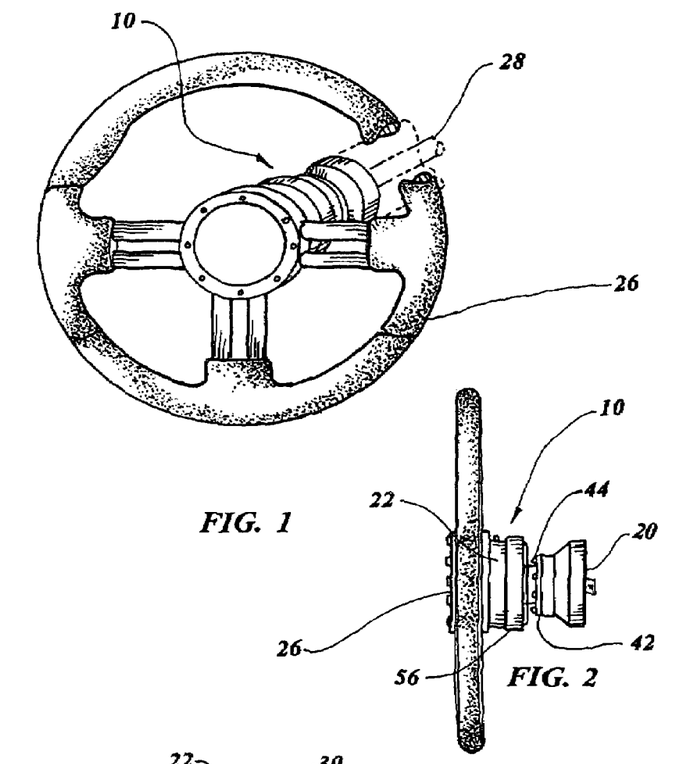
FIG. 1 is a partial isometric view of the lockable steering wheel quick-release unit for use in an automotive vehicle attached to a representative custom steering wheel in the preferred embodiment
FIG. 2 is a right side view of the lockable steering wheel quick-release unit attached to a custom steering wheel in the preferred embodiment.
Figure 3:
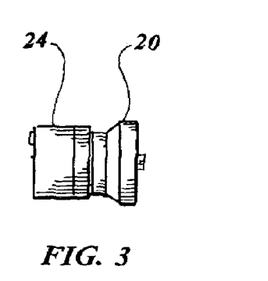
FIG. 3 is a right side view of the lockable steering wheel quick-release unit with the steering wheel including the remainder of the unit detached and the lock unit in place.
Figure 4:
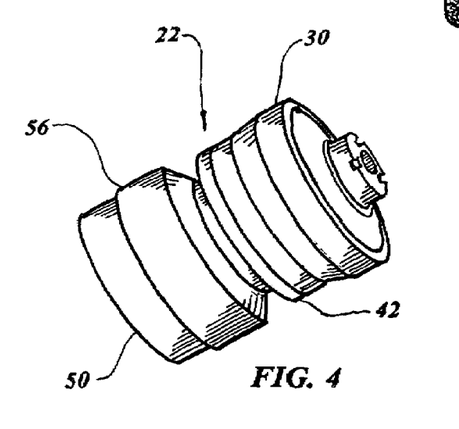
FIG. 4 is a partial isometric view of the lockable steering wheel quick-release unit assembly less the lock in the preferred embodiment.

The best mode for carrying out the invention is presented in terms of a preferred embodiment for a lockable steering wheel quick-release unit 10. The preferred embodiment, as shown in FIGS. 1 through 26, is comprised of three separate elements: a steering shaft hub assembly 20, a quick-release unit assembly 22, and a lock unit 24. FIGS. 1 and 2 illustrate the unit 10 attached to a typical custom steering wheel 26, and in FIG. 3, the lock unit 24 is coupled to the steering shaft hub assembly 20. FIG. 4 depicts the quick-release unit assembly 22 by itself, and FIG. 5 the lock unit 24 is also shown by itself.

The lockable steering wheel quick-release unit 10 is configured for use in an automotive vehicle that has a steering shaft 28 and that incorporates the use of the custom steering wheel 26, which are not part of the invention but are illustrated since they are necessary for completion of the interface utility.

Figures 8, 9, 10:
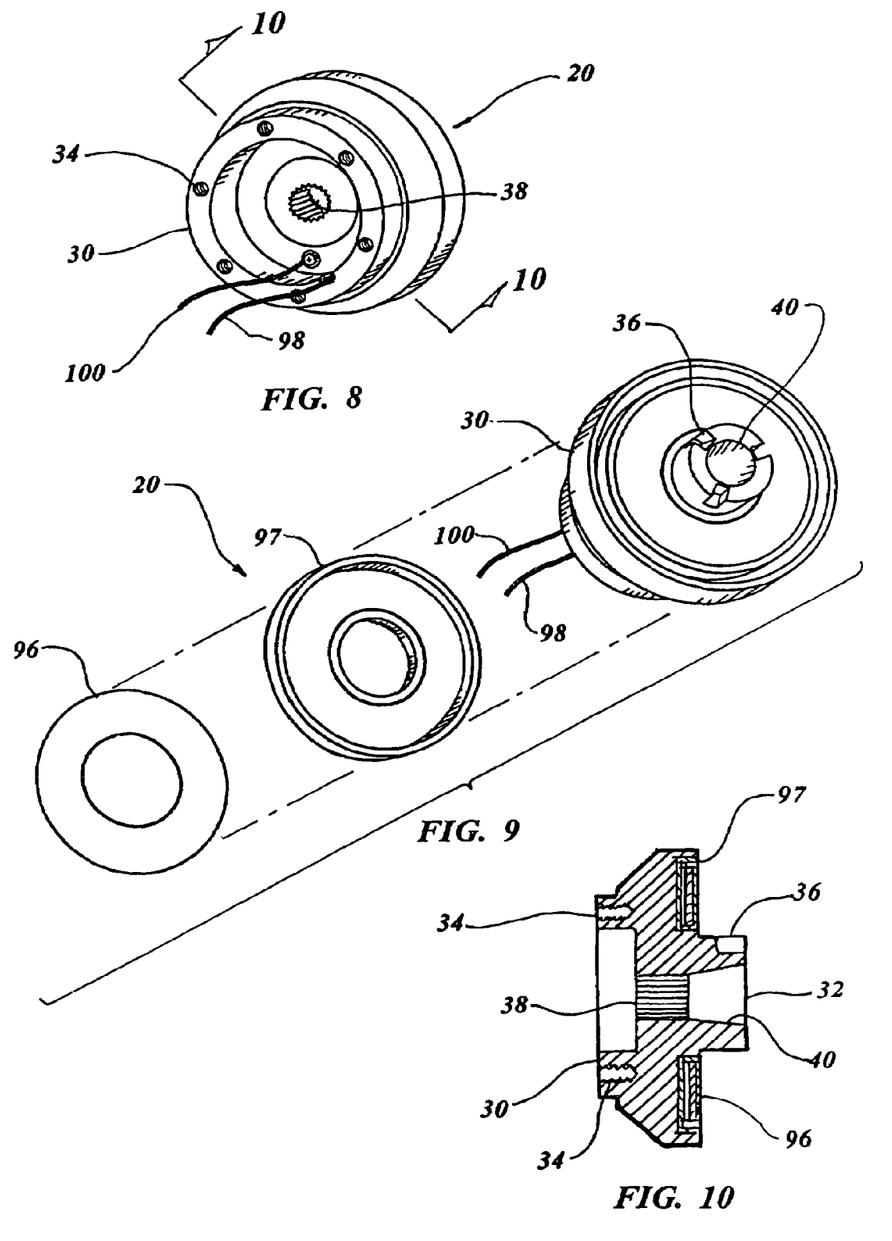
FIG. 8 is a partial isometric view of the steering shaft hub assembly viewed from the front and completely removed from the invention for clarity.
FIG. 9 is an exploded partial isometric view of the steering shaft hub assembly viewed from the rear in the preferred embodiment.
FIG. 10 is cross-sectional view taken along lines 10-10 of FIG. 8.

The quick-release assembly 22 includes a steering shaft hub 30 of the quick-release unit 10 having a center steering shaft bore 32 therethrough, shown in FIG. 10 for attachment to the automotive vehicle steering shaft 28, illustrated in FIG. 1. The steering shaft hub 30 also has a plurality of flanged-hub threaded mounting holes 34 on a centrally positioned bolt circle on the end opposite the bore 32. An outwardly-extending protrusion surrounding the bore 32 contains at least three turn signal notches 36 for use with the vehicle's turn indicating system. A female spline 38 on the steering shaft bore 32 is incorporated on a distal end, and a taper 40 is formed within the remainder of the bore 32 to mate with the vehicle's steering shaft 28. The steering shaft hub 30 is preferably constructed of powder paint coated aluminum, however other materials and finishes may be used with equal ease. The steering shaft hub 30 is shown in a front isometric view in FIG. 8, and a rear isometric exploded view in FIG. 9, with FIG. 10 illustrating the internal construction in cross-section.

Figures 11, 12:
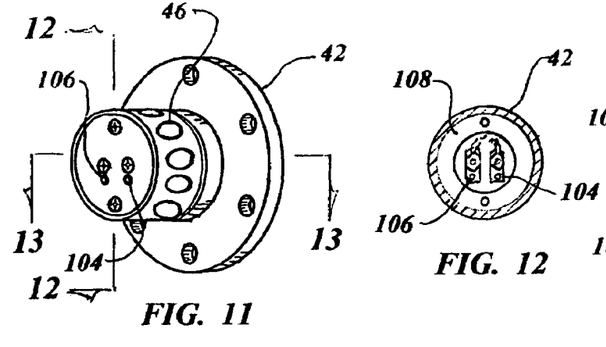
FIG. 11 is a partial isometric view of the flanged extending hub completely removed from the invention for clarity.
FIG. 12 is a cross-sectional view taken along lines 12-12 of FIG. 11.
Figure 13:
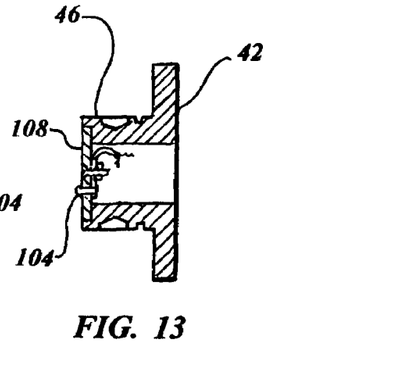
FIG. 13 is a cross-sectional view taken along lines 13-13 of FIG. 11.

The quick-release unit assembly 22 includes a flanged extending hub 42 that is attached to the steering shaft hub 30 by a plurality of threaded fasteners 44 that engage the flanged hub threaded mounting holes 34. The flanged extending hub 42 includes a plurality of peripheral recessed hollows 46 therein and is preferably constructed of powder paint coated aluminum. FIGS. 11-13 depict the flanged extending hub 42 shown alone in both in an isometric view and in cross-sections.

Figures 6, 7:
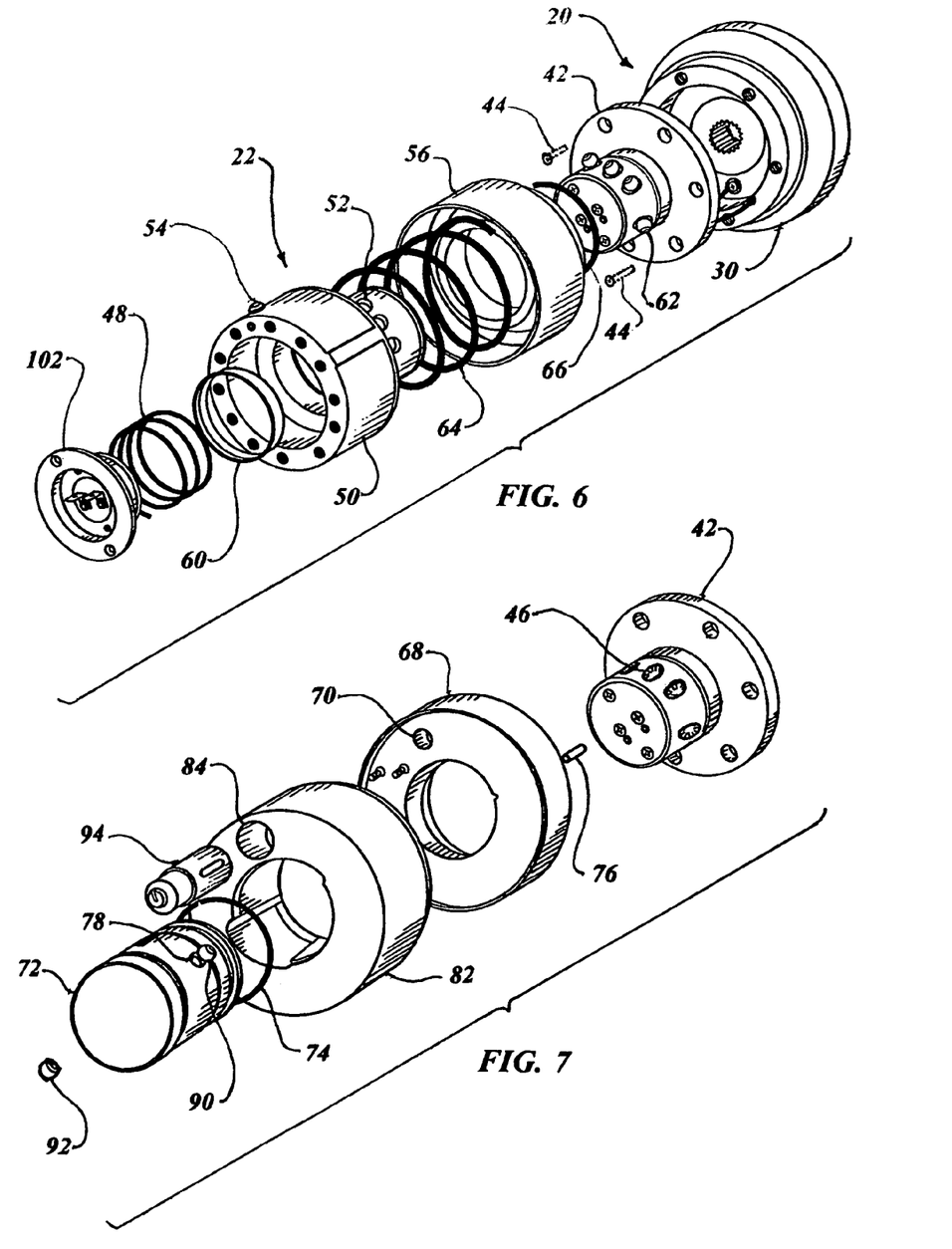
FIG. 6 is an exploded partial isometric view of the lockable steering wheel quick-release unit assembly less the lock in the preferred embodiment.
FIG. 7 exploded partial isometric view of the lock unit assembly and the mating shaft flanged hub in the preferred embodiment.
Figure 16:
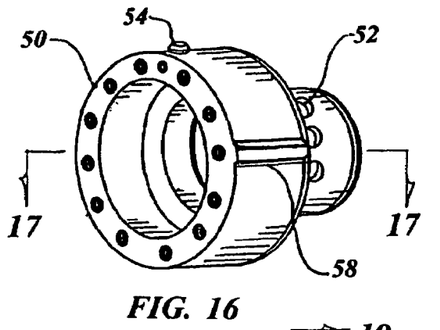
FIG. 16 is a partial isometric view of the steering wheel adapter completely removed from the invention for clarity.
Figure 17:
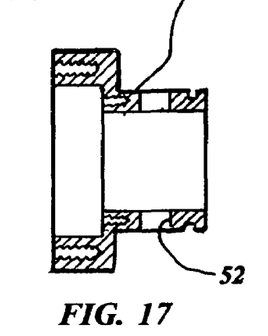
FIG. 17 is a cross-sectional view taken along lines 17-17 of FIG. 16.
Figure 18:
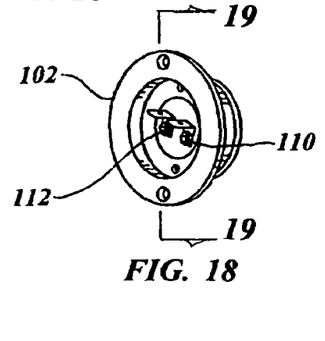
FIG. 18 is a partial isometric view of the insulated hub plate completely removed from the invention for clarity.
Figure 19:
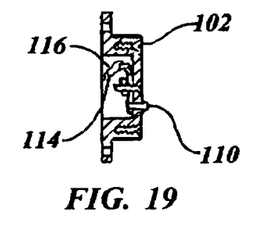
FIG. 19 is a cross-sectional view taken along lines 19-19 of FIG. 18.

A steering wheel adapter 50 attaches to the custom steering wheel 26, with the adapter 50 including a plurality of peripheral ball mounting holes 52 therethrough. The adapter 50 slideably engages the flanged extending hub 42, as illustrated in FIG. 6 A captivated release pin 54 extends from an outer peripheral surface of the adapter 50 for finally releasing the quick-release unit assembly 22 from the steering shaft hub 30 when a release sleeve 56 is manually retracted over the adapter 50. A plurality of ribs 58 extending outward from an outer peripheral surface of the adapter 50 prevent wear marks from the sliding movement of the release sleeve 56 onto the adapter 50. The adapter 50 is preferably, but not necessarily, also constructed of powder paint coated aluminum. FIGS. 16 and 17 illustrate the adapter 50 alone, and FIG. 6 illustrates the quick-release assembly 22 exploded showing the balance of the quick-release assembly 22 components.

A horn button support ring 60 is disposed within the confines of the adapter 50, as illustrated in FIG. 6, and is used to confine the horn push button of the custom steering wheel 26.

A plurality of balls 62 are disposed within the adapter peripheral ball mounting holes 52 and interface with the recessed hollows 46 of the flanged extending hub 42 during the locking procedure of the quick-release unit assembly 22. The plurality of balls 62 are preferably steel ball bearings, which are plentiful and in constant production throughout the world.

Figure 14:
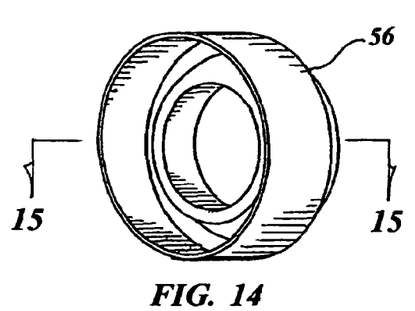
FIG. 14 is a partial isometric view of the sliding release sleeve completely removed from the invention for clarity.
Figure 15:
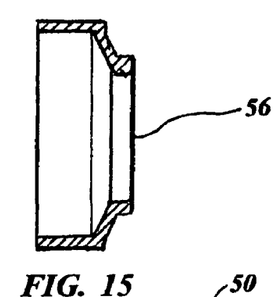
FIG. 15 is a cross-sectional view taken along lines 15-15 of FIG. 14.

The sliding release sleeve 56 is spring-loaded to slideably extend over the adapter 50, thereby retaining the balls 62 within the adapter 50 when the sliding release sleeve 56 is at rest under the influence of spring loading. The spring loading consists of a removal compression spring 64 that is positioned between the steering wheel adapter 50 and the sliding release sleeve 56, thereby preventing release of the unit assembly 22 until manually actuated. At rest, the balls 62 are forced into the flanged extending hub's peripheral recessed hollows 46, thereby interfacing with the steering wheel adapter peripheral ball mounting holes 52 and securely locking the adapter 50 to the steering shaft hub 30. When the release sleeve 56 is manually urged toward the steering wheel 26, away from the vehicle steering shaft 28, the balls 62 are freed, thus permitting movement away from the flanged extending hub's peripheral recessed hollows 46. The balls 62 fully engage into the steering wheel adapter peripheral ball mounting holes 52 releasing the steering wheel adapter 50 from the flanged extending hub 42. A retaining ring 66 is positioned within a groove in the adapter 50 to maintain the release sleeve 56 slideably within the adapter 50 under the compression of the removal spring 64. FIGS. 14 and 15 illustrate the sliding release sleeve 56 by itself, and FIG. 6 the sliding release sleeve 56 is shown in relationship with the other elements. The sliding release sleeve 56 consists of anodized aluminum construction in the preferred embodiment, as the outside surface is handled for removal, however other materials and finishes may be utilized.

Figure 5:
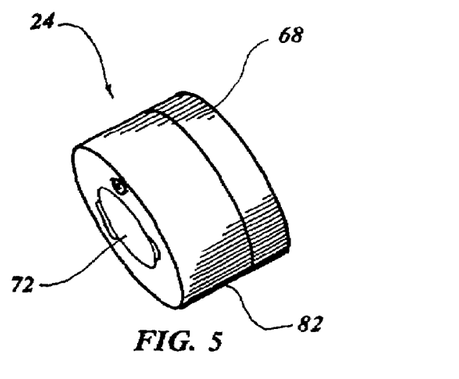
FIG. 5 is a partial isometric view of the lock unit assembly in the preferred embodiment.
Figure 20:
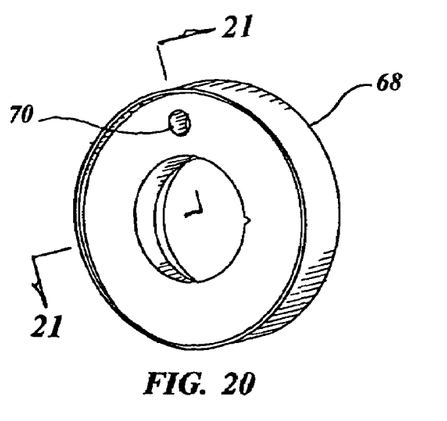
FIG. 20 is a partial isometric view of the hollow cylindrical base of the lock assembly completely removed from the invention for clarity.
Figure 21:
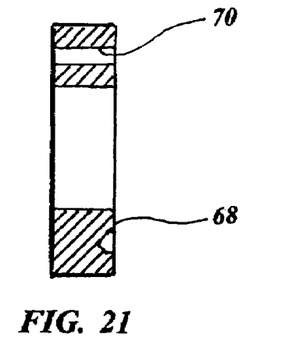
FIG. 21 is a cross-sectional view taken along lines 21-21 of FIG. 20.
Figures 22, 23, 24, 25, 26:
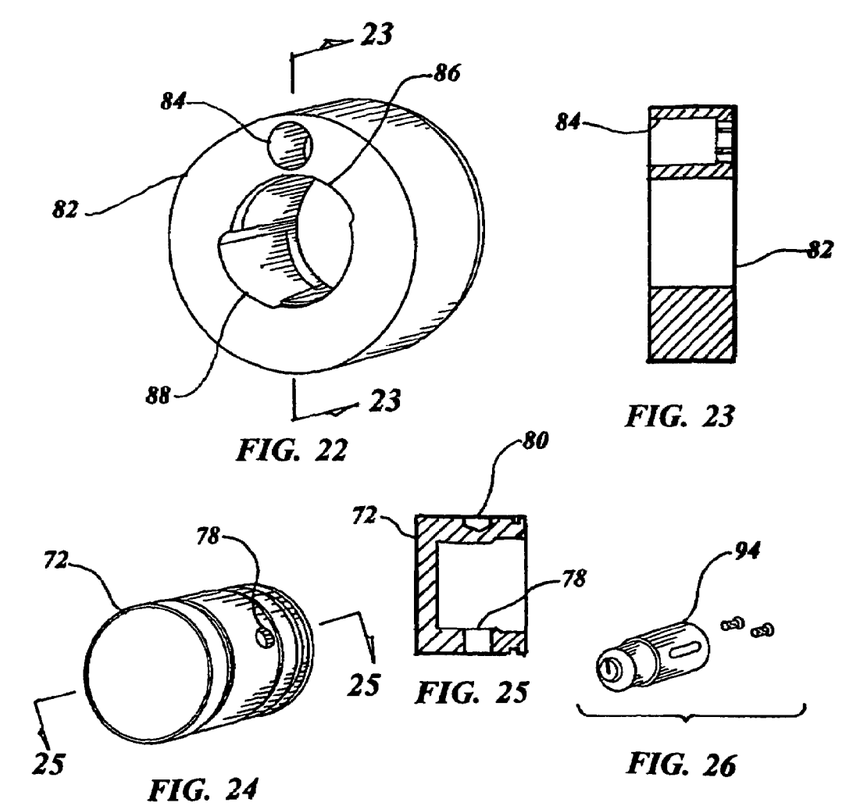
FIG. 22 is a partial isometric view of the lock outer cover completely removed from the invention for clarity.
FIG. 23 is a cross-sectional view taken along lines 23-23 of FIG. 22.
FIG. 24 is a partial isometric view of the stationary locking retainer completely removed from the invention for clarity.
FIG. 25 is a cross-sectional view taken along lines 25-25 of FIG. 24.
FIG. 26 is an exploded partial isometric view of the high security push bolt lock and attaching screws completely removed from the invention for clarity.

The lock unit 24, as shown in FIGS. 5 and 7, consists of a hollow center cylindrical base 68 having a lock bolt hole 70 therethrough, as shown by itself in FIGS. 20 and 21. A cylindrical stationary locking retainer 72, as depicted alone in FIGS. 24 and 25, is disposed within the hollow center of the base 68, which is held in place with a lock ring 74 and a rotation stop pin 76, as shown in FIG. 7. The locking retainer 72 includes a single ball mounting hole 78 on a first side, and a single recessed hollow 80 on an opposed second side.

A hollow center cylindrical lock outer cover 82 is rotatably disposed onto the stationary locking retainer 72, as shown in FIG. 7. The lock outer cover 82 includes a push bolt cavity 84, an eccentric recess 86 on a first inner surface of the hollow center and an opposed concentric recess 88 on a second inner surface of the hollow center, as illustrated best in FIG. 22. The rotation stop pin 76 interfaces with the concentric recess 88 preventing compete rotation therebetween. A first round ball 90 is disposed within the locking retainer single ball mounting hole 78 and interfaces with the lock outer cover eccentric recess 86

The lock unit 24 functions as follows: the lock unit 24 is placed over the flanged extending hub 42 after the steering wheel adapter 50 and custom steering wheel 26, have been removed. The lock outer cover 82 is then manually rotated to a locked position and the first round ball 90 is forced into one of the flanged extending hub's peripheral recessed hollows 46, thereby holding the lock unit 24 securely in place.

A second round ball 92 is disposed within the locking retainer single recessed hollow 80 and interfaces with the concentric recess 88, thereby limiting the rotational travel of the lock outer cover 82 relative to the hollow cylindrical base 68.

A high security push bolt lock 94 is disposed within the cylindrical outer cover push bolt cavity 84, with the push bolt of the lock 94 intersecting with the cylindrical base lock bolt hole 70, thus preventing rotation of the lock outer cover 82 with the cylindrical base 68 when the lock 94 is manually depressed. When locked, the attachment of the lock unit 24 to the flanged extending hub 42 is manually loaded allowing the integrity of the lock unit 24 to be totally assured.

Electrical connection means for transferring an electrical signal from an automotive horn circuit through the quick-release unit assembly 22 to a horn button on the custom steering wheel 26 is defined as utilizing the following elements and functions.

An insulated electrically-conductive slip ring 96 is incorporated into the steering shaft hub 30. A positive slip ring electrical conductor 98 is then connected to the slip ring 96, and a negative slip ring conductor 100 is connected to the steering shaft hub 30. A slip ring insulator 97 isolates the slip ring 96 from the hub 30.

An insulated contact adapter 108 is disposed within the flanged extending hub 42, as shown in FIGS. 11-13, with the insulated contact adapter 108 in electrical communication with the positive slip ring electrical conductor 98. The positive slip ring electrical conductor 98 terminates with a first positive contact pin 104, and the negative slip ring conductor 100 terminates with a first negative contact pin 106.

An insulated hub plate 102 having a second positive contact pin 110 is in electrical communication with the first positive contact pin 104, and a second negative contact pin 112 is in electrical communication with the first negative contact pin 106. An adapter positive electrical conductor 114 is attached to the second positive contact pin 110, and an adapter negative electrical conductor 116 is attached to the second negative contact pin 106, for attachment to a horn button of the custom steering wheel 26.

The ejection compression spring 48 is interfaced between the flanged extended hub 42 and the insulated contact adapter 108 that is located within the steering wheel adapter 50, which provides sufficient loading to assist in ejecting the adapter 50 with the attached steering wheel 26 when manually released.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A lockable steering wheel quick-release unit for use in an automotive vehicle having a steering shaft and a steering wheel, wherein said unit comprises:

a steering shaft hub having a center steering shaft bore therethrough for attachment to the automotive vehicle steering shaft, and said steering shaft hub having a plurality of flanged hub threaded mounting holes on a centrally positioned bolt circle, a flanged extending hub attached to said steering shaft hub, with a plurality of threaded fasteners engaging the flanged hub threaded mounting holes, also said flanged extending hub having a plurality of peripheral recessed hollows therein, a steering wheel adapter for attachment to said steering wheel, wherein said adapter has a plurality of peripheral ball mounting holes therethrough, with said adapter slideably engaging said flanged extending hub, a plurality of round balls disposed within said adapter peripheral ball mounting holes, and a spring-loaded sliding release sleeve slideably extending over said adapter, thereby retaining said balls such that when the sliding release sleeve is at rest under the influence of the spring loading, the balls are forced into the flanged extending hub's peripheral recessed hollows and interface with the steering wheel adapter peripheral ball mounting holes, thus securely locking the adapter to the steering shaft hub, and when manually urged away from the vehicle steering shaft, the balls are freed, thereby permitting movement away from the flanged extending hub's peripheral recessed hollows wherein said balls fully extend into the steering wheel adapter peripheral ball mounting holes releasing the steering wheel adapter from the flanged extending hub.

2. The lockable steering wheel quick-release unit as recited in claim 1 further comprising a lock unit having:
- a hollow center cylindrical base having a lock bolt hole therethrough,
- a cylindrical stationary locking retainer disposed within the hollow center of the base and held in place with a lock ring and a rotation stop pin, wherein the locking retainer has a single ball mounting hole on a first side and a single recessed hollow on an opposed second side,
- a hollow center cylindrical lock outer cover having a push bolt cavity therein, the lock outer cover having an eccentric recess on a first inner surface of the hollow center, and an opposed concentric recess on a second inner surface of the hollow center, with the outer cover rotatably disposed onto said stationary locking retainer,
- a first ball disposed within the locking retainer single ball mounting hole that interfaces with the lock outer cover eccentric recess such that when the lock unit is placed over the flanged extending hub when the steering wheel adapter attached to the steering wheel has been removed when the lock outer cover is rotated to a locked position the first ball is forced into one of the flanged extending hub peripheral recessed hollows,
- a second ball disposed within the locking retainer recessed hollow, interfaces with the concentric recess, thereby limiting the rotational travel of the outer cover relative to the base, and
- a lock unit disposed within the cylindrical outer cover push bolt cavity, with the push bolt of the lock intersecting with the cylindrical base lock bolt hole to prevent rotation of the lock outer cover with the cylindrical base, thereby securing the attachment of the lock unit to the flanged extending hub when the steering wheel and remainder of the quick-release unit are removed.

3. The lockable steering wheel quick-release unit as recited in claim 1 further comprising electrical connection means for transferring an electrical signal from an automotive horn circuit through the quick-release unit to a horn button on the steering wheel defined as:
- an insulated slip ring attached to the steering shaft hub, a positive slip ring electrical conductor connected to the slip ring, and a negative slip ring conductor connected to the steering shaft hub,
- an insulated hub plate that is disposed within the flanged extending hub in electrical communication with the positive slip ring electrical conductor terminating with a first positive contact pin, and the negative slip ring conductor terminating with a first negative contact pin, and
- an insulated contact adapter having a second positive contact pin in electrical communication with the first positive contact pin, and a second negative contact pin in electrical communication with the first negative contact pin, also an adapter positive electrical conductor attached to the second positive contact pin, along with an adapter negative electrical conductor attached to the second negative contact pin for attachment to a horn button of the steering wheel.

4. The lockable steering wheel quick-release unit as recited in claim 1 wherein said steering wheel shaft hub further has at least three turn signal notches for interfacing with a vehicle indicating system.

5. The lockable steering wheel quick-release unit as recited in claim 1 wherein said steering wheel shaft hub further has a female spline on a distal end of the steering shaft bore and a taper within the remainder of the bore.

6. The lockable steering wheel quick-release unit as recited in claim 1 wherein said steering shaft hub is constructed of powder paint coated aluminum.

7. The lockable steering wheel quick-release unit as recited in claim 1 further comprising an ejection compression spring that is interfaced between the flanged extended hub and the steering wheel adapter wherein said spring ejects the adapter when released.

8. The lockable steering wheel quick-release unit as recited in claim 1 wherein said flanged extended hub is constructed of powder paint coated aluminum.

9. The lockable steering wheel quick-release unit as recited in claim 1 wherein said steering wheel adapter further comprises a captivated release pin extending from an outer peripheral surface of the adapter for releasing the unit from the steering shaft hub when the release sleeve is manually retracted over the adapter.

10. The lockable steering wheel quick-release unit as recited in claim 1 wherein said steering wheel adapter further comprises a plurality of ribs that extend outward from an outer peripheral surface to prevent wear marks from the sliding movement of the release sleeve.

11. The lockable steering wheel quick-release unit as recited in claim 1 further comprising a removal compression spring that is positioned between said steering wheel adapter and said sliding release sleeve for preventing the release of the unit until manually actuated.

12. The lockable steering wheel quick-release unit as recited in claim 1 wherein said steering wheel adapter further comprises a horn button support ring.

13. The lockable steering wheel quick-release unit as recited in claim 1 wherein said steering wheel adapter is constructed of powder paint coated aluminum.

14. The lockable steering wheel quick-release unit as recited in claim 1 wherein said plurality of balls are steel ball bearings.

15. The lockable steering wheel quick-release unit as recited in claim 1 wherein said sliding release sleeve is constructed of anodized aluminum.

16. A steering shaft hub for use with a lockable steering wheel quick-release unit utilized in an automotive vehicle having a steering shaft and a steering wheel, which comprises:
- said steering shaft hub having a center steering shaft bore therethrough for attachment to the automotive vehicle steering shaft,
- said steering shaft hub having a plurality of flanged hub threaded mounting holes on a centrally positioned bolt circle,
- said steering shaft hub having at least three turn signal notches for interfacing with a vehicle indicating system,
- said steering shaft hub further having a female spline on a distal end of the steering shaft bore and a taper within the remainder of the bore, and
- said steering shaft hub is constructed of powder paint coated aluminum.

17. The steering shaft hub as recited in claim 16 further having:
- an insulated hub plate incorporated into the steering shaft hub,
- an electrically-conductive slip ring engaging the insulated hub plate, and a positive slip ring electrical conductor connected to the slip ring, and a negative slip ring conductor connected to the steering shaft hub for establishing an electrical signal from an automotive horn circuit through the quick-release unit to a horn button on the steering wheel.

* * * * *